United States Patent
Nakayama et al.

(10) Patent No.: US 8,658,057 B2
(45) Date of Patent: Feb. 25, 2014

(54) LIQUID CRYSTAL POLYESTER RESIN COMPOSITION

(75) Inventors: Toshio Nakayama, Kanagawa (JP); Satoshi Murouchi, Kanagawa (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 0 days.

(21) Appl. No.: 13/498,816

(22) PCT Filed: Jun. 28, 2010

(86) PCT No.: PCT/JP2010/061356
§ 371 (c)(1),
(2), (4) Date: Jun. 8, 2012

(87) PCT Pub. No.: WO2011/036927
PCT Pub. Date: Mar. 31, 2011

(65) Prior Publication Data
US 2012/0235089 A1    Sep. 20, 2012

(30) Foreign Application Priority Data
Sep. 28, 2009 (JP) ................. 2009-223024

(51) Int. Cl.
| | | |
|---|---|---|
| C09K 19/52 | (2006.01) | |
| C09K 19/54 | (2006.01) | |
| C09K 19/00 | (2006.01) | |
| C09K 19/02 | (2006.01) | |
| B22F 1/00 | (2006.01) | |

(52) U.S. Cl.
USPC ............. 252/299.01; 252/299.5; 428/1.1; 524/1; 349/167

(58) Field of Classification Search
USPC ............. 252/299.01, 299.5; 428/1.1; 524/1; 349/167
See application file for complete search history.

(56) References Cited

U.S. PATENT DOCUMENTS

| | | | | |
|---|---|---|---|---|
| 7,985,351 B2 * | 7/2011 | Yamauchi et al. | ....... | 252/299.01 |
| 8,192,645 B2 * | 6/2012 | Murouchi et al. | ....... | 252/299.01 |
| 2004/0165390 A1 | 8/2004 | Sato et al. | | |
| 2008/0198254 A1 | 8/2008 | Nagasaki | | |
| 2008/0203358 A1 | 8/2008 | Mizumoto et al. | | |
| 2011/0089371 A1 | 4/2011 | Murouchi et al. | | |

FOREIGN PATENT DOCUMENTS

| | | |
|---|---|---|
| JP | 07-196894 | 8/1995 |
| JP | 08-041187 | 2/1996 |
| JP | 2000-339665 | 12/2000 |
| JP | 2004-256673 | 9/2004 |
| JP | 2006-246461 | 9/2006 |
| JP | 2007-138143 | 6/2007 |
| JP | 2008-197220 | 8/2008 |
| JP | 2008-197671 | 8/2008 |
| JP | 2008-239950 | 10/2008 |
| JP | 2010106177 | 5/2010 |
| WO | 2009-119863 | 10/2009 |
| WO | 2010050327 | 5/2010 |

* cited by examiner

*Primary Examiner* — Geraldina Visconti
(74) *Attorney, Agent, or Firm* — Volpe and Koenig, P.C.

(57) ABSTRACT

A liquid crystal polyester resin composition for camera modules is used, the composition including, based on 100 parts by mass of the composition as a whole, (A) 49.5 to 69.5 parts by mass of a liquid crystal polyester, (B) 30.0 to 50.0 parts by mass of an irregular form or spherical powder having a Mohs hardness of 5 or higher and a primary particle diameter of 5 µm or less, and (C) 0.5 to 5.0 parts by mass of carbon black. The use of the resin composition allows a reduction in the amount of dust generated (particles falling off) during the production of the camera, the use of the camera, and the operation of the camera modules. The resin composition has high surface hardness, is excellent in balance between heat resistance, stiffness, moldability, and resistance to falling of particles off a surface, and causes no malfunction during autofocus control.

7 Claims, No Drawings

LIQUID CRYSTAL POLYESTER RESIN COMPOSITION

This application is a 35 U.S.C. §371 national phase application of PCT/JP2010/061356, which was filed Jun. 28, 2010 and is incorporated herein by reference as if fully set forth.

TECHNICAL FIELD

The present invention relates to materials for camera modules, and more particularly to liquid crystal polyester resin compositions for camera modules that have high heat resistance, excellent thin-wall moldability, high surface hardness, and good mechanical properties, do not cause any malfunction in autofocus camera modules, and cause only a small amount of dust (particle exfoliation) during the production process of camera module components such as a "lens barrel section (a section in which lenses are installed)," a "mount holder section (a section to which the barrel is attached to secure it to a substrate)," a "frame of a CMOS (an image sensor)," "a shutter and a shutter bobbin section" and during operation of the camera modules.

BACKGROUND ART

A camera module is one of the major devices used to input and output information transmitted in a digital form. Camera modules are installed in mobile phones, laptop computers, digital cameras, digital video cameras, and other devices, and some of the camera modules have imaging functions including not only a still imaging function but also a dynamic monitoring function (such as a rear monitoring function for an automobile).

Fixed-focus camera modules are installed in mobile phones etc. However, such a camera module as a whole could not be mounted using the surface mount technology (abbreviated as SMT) because there was no plastic lens that can withstand reflow soldering (in which a material is placed on a substrate coated with a solder paste by, for example, printing and then the solder is melted in a reflow furnace to secure the material to the substrate). Therefore, to address this issue, in a conventional assembling process, module components other than a lens section are surface-mounted on a substrate, and then the lenses are attached. Alternatively, after the entire camera module is assembled, it is attached to the substrate using a different method.

Low-cost plastic lenses that can withstand reflow soldering have recently been developed, allowing the entire camera module to be surface-mounted. In such circumstances, a liquid crystal polymer having high heat resistance and thin-wall moldability is being used for a "lens barrel section (a section in which lenses are installed)," a "mount holder section (a section to which the barrel is attached to secure it to a substrate)," a "frame of a CMOS (an image sensor)," "a shutter and a shutter bobbin section" (see Patent Literature 1). A recent trend is to use a liquid crystal polymer for camera module components. This significantly facilitates a reduction in size of camera modules and also significantly facilitates a reduction in size and thickness of each module component. Such a liquid crystal polymer has flame retardation without adding a halogen-based flame retardant. Therefore, to meet the demand for halogen-free plastics used for recent environmental measures, liquid crystal polymers are increasingly used for these components.

In a camera module equipped with a general fixed-focus optical system, a CMOS (an image sensor) is configured by mounting a multilayer chip on a signal processing chip. In the process of assembling the camera module, the focus of the optical component system must be adjusted manually (a lens barrel section screwed into a mount holder is rotated and moved to change the distance between the lens and the image sensor so that the focal distance is optimized) (see Patent Literature 1). However, with a conventional liquid polymer resin composition, powders (particles) of the resin composition fall off the rubbing contact portion of screws both in the lens barrel and the mount holder and the surfaces of these molded components when the lens barrel is rotated and moved in the focus adjusting step. These particles fall onto the COMS image sensor or a filter (an IR cut filter), and this is one of the main causes of image defects. Such falling of particles may also occur during the use of a product to which such components are installed. Therefore, there is a demand to provide a liquid crystal polymer resin composition that is used as the material for the lens barrel section, mount holder section, CMOS (image sensor) frame, shutter, and shutter bobbin section of a camera module and causes only a small amount of particles to fall off.

The driving methods for the camera module of a camera having an autofocus function include a voice coil motor system and a piezoelectric motor system. In the voice coil motor system, the coil is attached to the outer circumference of a lens holder for holding a lens, and a ring-shaped magnet housing (which may be referred to a case to which a magnet is attached) is disposed so as to surround the lens holder, as shown in, for example, the drawings in Patent Literature 2. The focus is adjusted by moving the lens holder in an optical axis direction using an electromagnetic induction phenomenon. A problem when a conventional liquid crystal polymer resin composition is used for the voice coil motor system is that, when, for example, a mobile phone is dropped and a shock is applied to its camera module, the lens holder inside the camera module comes into collision with the magnet housing or a base section (the surface to which the IR filter is secured). This results in dents on the surfaces of these components, causing the operation failure of the camera module.

In the structure for the piezoelectric motor system, a vibrating member such as a carbon shaft serving as a driving shaft is connected to one expanding direction end of a piezoelectric element that expands and contracts when voltage is applied, and a lens holder holding a lens is friction-fitted with the driving shaft so as to be movable in the axial direction of the driving shaft. The driving shaft is arranged in parallel to the optical axis of the lens. The lens holder is driven in the optical axis direction when the vibrating member used as the driving shaft expands and contracts according to the expanding-contracting vibration of the piezoelectric element, and the focal point can thereby be adjusted (see, for example, Patent Literature 3). A problem when a conventional liquid crystal polymer resin composition is used is that a driving failure (a reduction in driving sensitivity) occurs because the contact between the carbon shaft used as the driving shaft and the fitting surface of the lens holder becomes irregular.

One cause of the above problems may include the fact that the surface hardness of the camera module components is low.

A molded product for camera module components has been proposed in which glass fibers are added to a liquid crystal polymer to reduce the occurrence of particles (see Patent Literature 4). However, there is no description about the surface hardness of the molded product. Patent Literature 5 proposes a resin composition for a resin-made reflecting plate for, for example, a LED. In this resin composition, titanium oxide serving as a white pigment is added to a liquid crystal polyester resin to improve the reflectivity and hue.

However, there is no finding about the surface hardness of a molded product and the occurrence of particles. Patent Literature 6 proposes a thin high-stiffness material obtained by mono-dispersing 1 to 5 parts by weight of silica fine particles having an average particle diameter of 0.08 to less than 0.2 μm in 100 parts by weight of liquid crystal polyester. However, the particle diameter range and amount added of the silica fine particles are different from those in the present invention, and there is no finding about the surface hardness of a molded product and particles falling off its surface.

PRIOR ART LITERATURES

Patent Literature

Patent Literature 1: Japanese Patent Application Laid-Open No. 2006-246461
Patent Literature 2: Japanese Patent Application Laid-Open No. 2008-197671
Patent Literature 3: Japanese Patent Application Laid-Open No. 2008-197220
Patent Literature 4: Japanese Patent Application Laid-Open No. 2008-239950
Patent Literature 5: Japanese Patent Application Laid-Open No. 2004-256673
Patent Literature 6: Japanese Patent Application Laid-Open No. 2007-138143

SUMMARY OF INVENTION

Technical Problem

As described above, it is necessary to prevent the operation failure of a camera module by increasing the surface hardness of its components such as the lens barrel, mount holder, and lens holder members made of a conventional liquid crystal polymer resin composition while its good physical properties including stiffness, heat resistance, and thin-wall processability is maintained. It is also necessary to control the occurrence of particles that causes a reduction in product acceptance rate and product performance during the process of assembling the camera module and during the use of the camera. However, at present, these requirements cannot be met simultaneously.

The present invention has been made to solve these important but unsolved problems, and it is an object to provide a molding material comprising a liquid crystal polyester resin composition suitable for camera module components. The molding material is excellent in and well-balanced between stiffness, heat resistance, and thin-wall processability, provides a molded product having high surface hardness, and causes only a small amount of particles to be generated during the process of assembling the camera module and during its use.

Means to Solve Problems

To solve the foregoing problems, the present inventors have made various studies and found the following. A composition obtained by adding a specific amount of a powder having a Mohs hardness of 5 or more and a primary particle diameter of 5 μm or less and a specific amount of carbon black to a liquid crystal polyester resin can be injection-molded to obtain a product having high surface hardness and good surface transferability. This composition can provide a camera module component having high surface hardness and causing only a small amount of objects to fall off the surface of the component, i.e., only a small amount of particles to be generated, during the assembly of the module and the use of the camera. Thus, the inventors have reached the present invention.

A first aspect of the present invention relates to a liquid crystal polyester resin composition for a camera module, comprising, based on 100 parts by mass of the composition as a whole, (A) 49.5 to 69.5 parts by mass of a liquid crystal polyester, (B) 30.0 to 50.0 parts by mass of an irregular form or spherical powder having a Mohs hardness of 5 or more and a primary particle diameter of 5 μm or less, and (C) 0.5 to 5.0 parts by mass of carbon black.

A second aspect of the present invention relates to the liquid crystal polyester resin composition according to the first aspect of the present invention, wherein the (B) component is selected from titanium oxide, silica, and aluminum oxide.

A third aspect of the present invention relates to the liquid crystal polyester resin composition according to the first or second aspect of the present invention, wherein the number of exfoliations from the surface of molded products molded by injection molding of the liquid crystal polyester resin composition according to the first or second aspect of the present invention is 200 or less, the number of exfoliations being defined as the number of particles falling off when the two injection molded products are placed in 266 mL of pure water and subjected to ultrasonic cleaning at 40 kHz and a power of 480 W for 30 seconds, each of the injection molded products having a cylindrical shape of an outer diameter of 7 mm, an inner diameter of 6 mm, and a height of 4 mm, a screw-cutting structure with a pitch of 0.3 mm and a groove depth of 0.2 mm being formed on the inner surface of each of the injection molded products, the number of particles falling off being the number of particles contained in 10 mL of the pure water after cleaning and having a maximum diameter of 2 μm or larger.

A fourth aspect of the present invention relates to the liquid crystal polyester resin composition according to any one of the first to third aspects of the present invention, wherein the Rockwell hardness of a molded product molded by injection molding of the above liquid crystal polyester resin composition is 80 or higher.

A fifth aspect of the present invention relates to the liquid crystal polyester resin composition according to any one of the first to fourth aspects of the present invention, wherein the Izod impact strength of a molded product molded by injection molding of the above liquid crystal polyester resin composition is 40 KJ/m² or higher.

A sixth aspect of the present invention relates to the liquid crystal polyester resin composition according to any one of the first to fifth aspects of the present invention, wherein the deflection temperature under load of a molded product molded by injection molding of the above liquid crystal polyester resin composition is 245° C. or higher.

A seventh aspect of the present invention relates to a camera module component produced by injection molding of the liquid crystal polyester resin composition according to any one of the first to sixth aspects of the present invention.

Advantageous Effects of Invention

A molded product formed from the liquid crystal polyester resin composition according to the present invention has good surface hardness and thin-wall processability and is excellent in surface transferability and surface exfoliation properties. Therefore, the deformation of the molded product caused by a shock is small, and the amount of particles generated during an assembly process and in use is small. A component for a camera module that is optimal to drive an autofocus mechanism stably can thereby be provided.

DESCRIPTION OF EMBODIMENTS

<(A) Liquid Crystal Polyester>

Liquid crystal polyesters used in the present invention form anisotropic melts. Of these, a wholly aromatic liquid crystal polyester obtained by a polycondensation reaction of substantially only aromatic compounds is preferred.

Examples of the structural unit of the liquid crystal polyester constituting the liquid crystal polyester resin composition of the present invention include: combinations of aromatic dicarboxylic acids and aromatic diols; combinations of different aromatic hydroxy carboxylic acids; combinations of aromatic hydroxy carboxylic acids, aromatic dicarboxylic acids, and aromatic diols; and structural units obtained by reacting aromatic hydroxy carboxylic acids with polyesters such as polyethylene terephthalate. Specific examples of the structural unit include the following.

Structural units derived from aromatic hydroxy carboxylic acids.

[Chem. 1]

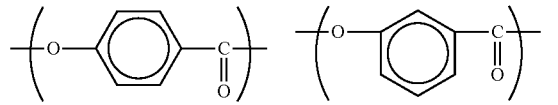

(A₁)    (A₃)

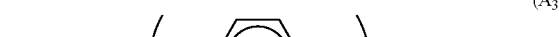

(X₁: ハロゲン原子またはアルキル基)

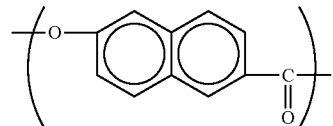

(A₂)

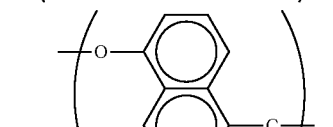

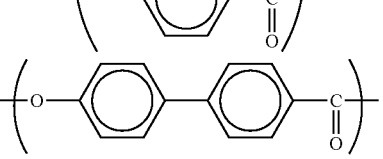

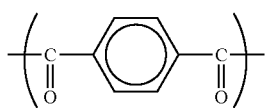

(X₁: a halogen atom or an alkyl group)
Structural units derived from aromatic dicarboxylic acids.

[Chem. 2]

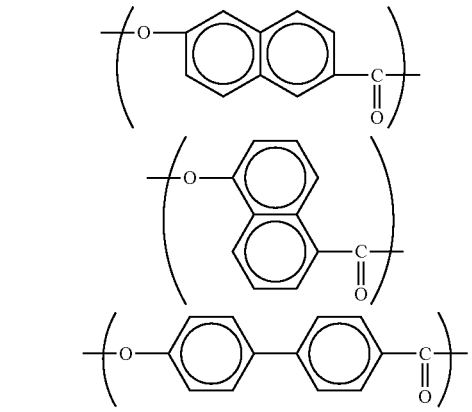

(B₁)

(B₂)

(B₄)

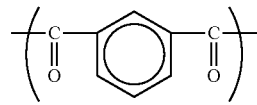

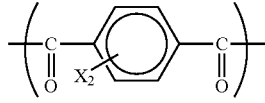

(X₂: ハロゲン原子, アルキル基, またはアリール基)

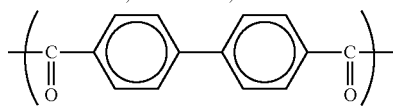

(B₃)

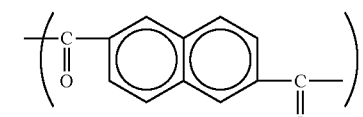

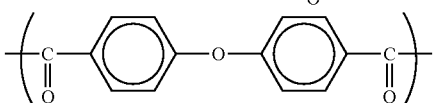

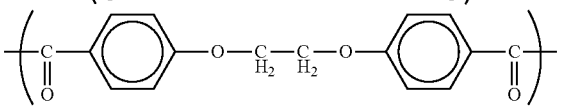

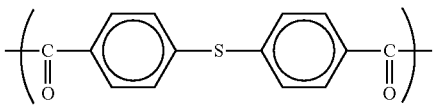

(X₂: a halogen atom, an alkyl group, or an aryl group)
Structural units derived from aromatic diols.

[Chem. 3]

(C₁)

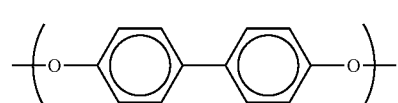

(C₂)

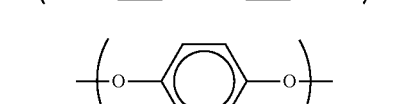

(C₃)

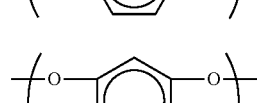

(C₄)

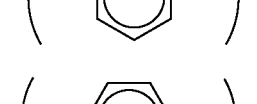

(X₂: またはアリ, アルキル基, ハロゲン原子 - ル基)

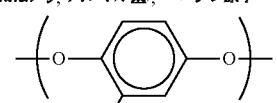

(X₃: H, ハロゲン原子, またはアルキル基)

-continued

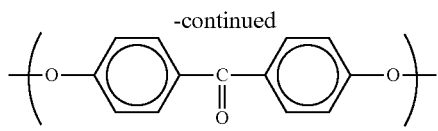

($X_2$: a halogen atom, an alkyl group, or an aryl group)
($X_3$: a halogen atom or an alkyl group)

From the viewpoint of the balance between heat resistance, mechanical properties, and processability, a preferred liquid crystal polyester resin contains the above structural unit (A1) in an amount of 30 percent by mole or more and more preferably (A1) and (B1) in a total amount of 60 percent by mole or more.

A particularly preferred liquid crystal polyester is a wholly aromatic liquid crystal polyester having a melting point of 320° C. or higher and obtained by polycondensation of 80 to 100 percent by mole of p-hydroxybenzoic acid (I), terephthalic acid (II), and 4,4'-dihydroxybiphenyl (III) (including derivatives thereof, e.g., repeating units (A3) and (B4) and repeating units obtained by substituting at least part of aromatic rings in the structural formula (C1) with a halogen atom, an alkyl group, or an aryl group) (provided that the total amount of (I) and (II) is 60 percent by mole or more) and 0 to 20 percent by mole of another aromatic compound that can be subjected to a polycondensation reaction with any of (I), (II), and (III). Another particularly preferred liquid crystal polyester is a wholly aromatic liquid crystal polyester having a melting point of 320° C. or higher and obtained by polycondensation of 90 to 99 percent by mole of p-hydroxybenzoic acid (I), terephthalic acid (II), and 4,4'-dihydroxybiphenyl (III) (including the above-described derivatives thereof) (provided that the total amount of (I) and (II) is 60 percent by mole or more) and 1 to 10 percent by mole of another aromatic compound that can be subjected to a dehydration-condensation reaction with (I), (II), and (III) (the total amount of the above compounds is 100 percent by mole).

Preferred combinations of the above structural units include:
(A1);
(A1), (B1), and (C1);
(A1), (B1), (B2), and (C1);
(A1), (B1), (B2), and (C2);
(A1), (B1), (B3), and (C1);
(A1), (B1), (B3), and (C2);
(A1), (B1), (B2), (C1), and (C2); and
(A1), (A2), (B1), and (C1).

As a particularly preferred monomer composition ratio, 80 to 100 percent by mole of p-hydroxybenzoic acid, terephthalic acid, and 4,4'-dihydroxybiphenyl (including the above-described derivatives) and 0 to 20 percent by mole of an aromatic compound selected from aromatic diols, aromatic hydroxy carboxylic acids, and aromatic dicarboxylic acids other than the above compounds (the total amount of the above compounds is 100 percent by mole) are subjected to polycondensation to provide a wholly aromatic liquid crystal polyester resin. If the total amount of p-hydroxybenzoic acid, terephthalic acid, and 4,4'-dihydroxybiphenyl is less than 80 percent by mole, the heat resistance tends to decrease, which is not preferred.

Any known method can be used as method of producing the liquid crystal polyester used in the present invention. For example, a production method only by melt polymerization or a production method by two-step polymerization (melt polymerization and solid phase polymerization) can be used. In a specific exemplary production method, a reactor is charged with a monomer selected from aromatic dihydroxy compounds, aromatic hydroxy carboxylic acid compounds, and aromatic dicarboxylic acid compounds, and acetic anhydride is added to acetylate hydroxy groups in the monomer. Then the product is subjected to a deacetic-acid (i.e. acetic acid eliminating) polycondensation reaction. In one exemplary method of producing a polyester resin, p-hydroxybenzoic acid, terephthalic acid, isophthalic acid, and 4,4'-dihydroxybiphenyl are placed in a reactor in a nitrogen atmosphere, and acetic anhydride is added to perform acetylation under reflux of acetic anhydride. Then the temperature is raised, and deacetic-acid polycondensation is performed in the temperature range of 150 to 350° C. while the acetic acid is distilled. The polymerization time can be selected in the range of one hour to several tens of hours. In the production of the liquid crystal polyester used in the present invention, the monomer may or may not be dried before the production.

When a polymer obtained by melt polymerization is further subjected to solid phase polymerization, the following method, for example, is preferably selected. The polymer obtained by the melt polymerization is solidified and then pulverized into a powder or flake form. Then a known solid phase polymerization method is performed, for example, heat treatment is performed in the temperature range of 200 to 350° C. in an inert gas atmosphere such as a nitrogen atmosphere for 1 to 30 hours. The solid phase polymerization may be performed under stirring or in a stationary state without stirring.

In the polymerization reaction, a catalyst may or may not be used. The catalyst used may be any known catalyst used as a polycondensation catalyst for polyester. Examples of such a catalyst include: metal salt catalysts such as magnesium acetate, stannous acetate, tetrabutyl titanate, lead acetate, sodium acetate, potassium acetate, and antimony trioxide; and organic compound catalysts such as N-methylimidazole.

No particular limitation is imposed on the polymerization reactor used for melt polymerization. A reactor generally used for the reaction of a high-viscosity fluid is preferably used. Examples of such a reactor include: a stirring vessel-type polymerization reactor including a stirrer having stirring blades of any of various types such as an anchor type, a multistage type, a spiral strip type, a spiral shaft type, and other types obtained by modifying the above types; and a mixer, such as a kneader, a roller mill, and a Banbury mixer, used generally for kneading of a resin.

The form of the liquid crystal polyester resin used in the present invention may be any of a powder form, a granular form, and a pellet form. From the viewpoint of dispersibility during mixing with a filler, a powder or granular form is preferred.

The amount of the liquid crystal polyester (A) contained in the liquid crystal polyester resin composition of the present invention is preferably 49.5 to 69.5 parts by mass based on 100 parts by mass of the total amount of the resin composition and particularly preferably 55.0 to 69.5 parts by mass. If the amount is less than 49.5 parts by mass, the flowability is significantly reduced. An amount exceeding 69.5 parts by mass is not preferred because the Rockwell hardness of a molded product produced by injection molding of the composition becomes low.

<(B) Irregular Form or Spherical Powder Having a Mohs Hardness of 5 or Higher and a Primary Particle Diameter of 5 μm or Less>

In the present invention, an irregular form or spherical powder having a Mohs hardness of 5 or higher and a primary particle diameter of 5 μm or less must be used as a material included in the resin composition. The Mohs hardness is an empirical scale of the hardness of a mineral obtained by comparison with 10 types of reference minerals. The reference minerals are talc, gypsum, calcite, fluorite, apatite, orthoclase feldspar, quartz, topaz, corundum, and diamond that are arranged in ascending order of hardness (Mohs hardness 1 (softest) to Mohs hardness 10 (hardest)). A sample material subjected to hardness measurement is scratched with the reference minerals, and the hardness is determined according to the presence or absence of scratches. For example, when no scratches are formed using fluorite but scratches are formed using apatite, the Mohs hardness is 4.5 (this means that the hardness is between 4 and 5). A new Mohs hardness scale using 15 types of minerals is sometimes used. The correspondence between the new Mohs hardness (15 scales) and the conventional Mohs hardness (10 scales) is as follows.

| NEW MOHS HARDNESS (15 SCALES) | MOHS HARDNESS (10 SCALES) |
|---|---|
| 1 | 1 |
| 2 | 2 |
| 3 | 3 |
| 4 | 4 |
| 5 | 5 |
| 6 | 6 |
| 7 | 6.5 |
| 8 | 7 |
| 9 | 8 |
| 10 | 8.3 |
| 11 | 8.7 |
| 12 | 9 |
| 13 | 9.3 |
| 14 | 9.6 |
| 15 | 10 |

The Mohs hardness of the component (B) used in the present invention must be 5 or higher, and therefore the hardness must be equivalent or higher than that of apatite. When the Mohs hardness is 5 or higher, the Rockwell hardness of an injection molded product is 80 or higher. Therefore, the surface hardness is sufficiently high, and surface dents caused by the collision between molded camera module components and the occurrence of the malfunction of a piezoelectric type motor can be suppressed. A Mohs hardness of less than 5 is not preferred because the surface hardness of a molded product produced by injection molding of the liquid crystal polyester resin composition is insufficient.

The primary particle diameter is the number average particle diameter of primary particles (minimum particles that can be distinguished from others). The number average particle diameter is generally measured by, for example, dynamic light scattering or laser light scattering.

The primary particle diameter of the component (B) in the present invention is 5 μm or smaller and preferably 0.1 to 5 μm. When the primary particle diameter is 5 μm or smaller, an injection molded product of the liquid crystal polyester resin composition has a smooth and good surface state, and the amount of particles generated from the surface by shock and friction is small. Particles having a primary particle diameter of larger than 5 μm are not preferred because the smoothness of the surface state of an injection molded product of the liquid crystal polyester resin composition is lost.

Examples of the irregular form or spherical particles having a Mohs hardness of 5 or higher and a primary particle diameter of 5 μm or smaller include particles of titanium oxide, silica, barium titanate, and aluminum oxide and glass powders. Of these, particles of titanium oxide, silica, and aluminum oxide are particularly preferred.

The formulated amount of the irregular form or spherical powder (B) having a Mohs hardness of 5 or higher and a primary particle diameter of 5 μm or less in the liquid crystal polyester resin composition of the present invention is 30.0 to 50.0 parts by mass based on 100 parts by mass of the composition as a whole, and more preferably 40.0 to 50.0 parts by mass. If a content is less than 30.0 parts by mass, it is not preferred because the Rockwell hardness of a molded product produced by injection molding of the composition becomes low. If the content exceeds 50.0 parts by mass, the productivity and the moldability deteriorate.

<(C) Carbon Black>

No particular limitation is imposed on the carbon black used in the present invention because it is used for coloring a resin and commonly available.

The formulated amount of carbon black added is preferably in the range of 0.5 to 5.0 parts by mass based on 100 parts by mass of the resin composition as a whole. If the formulated amount of carbon black added is less than 0.5 parts by mass, the pitch darkness of the resin composition obtained becomes low, and the light-shielding properties deteriorate. Even if the carbon black is added in an amount larger than 5.0 parts by mass, the coloring properties are not improved, but the cost increases, which is not preferred.

<Other Additives>

To impart prescribed characteristics to the composition of the present invention, commonly used additives and other thermoplastic resins may be added thereto within a range in which the objects of the present invention are not impaired. Examples of such additives include: antioxidant and thermal stabilizers (such as hindered phenol, hydroquinone, phosphites, and substitution products thereof); UV absorbers (such as resorcinol, salicylate, benzotriazole, and benzophenone); slip additives and release agents (such as montanic acid, salts thereof, esters thereof, half esters thereof, stearyl alcohol, stearamide, and polyethylene wax); plasticizers; antistatic agents; and flame retardants.

<Rockwell Hardness and Izod Impact Strength>

The Rockwell hardness of a molded product produced by injection molding of the liquid crystal polyester resin composition of the present invention is preferably 80 or higher. If the Rockwell hardness is less than 80, the surface hardness of the molded product is insufficient. Therefore, camera module components molded using the composition may collide with each other in the module to cause dents, and a problem such as the malfunction of a piezoelectric type motor may occur.

The Izod impact strength of a molded product produced by injection molding of the liquid crystal polyester resin composition of the present invention is preferably 40 KJ/m$^2$ or higher. If the Izod impact strength is less than 40 KJ/m$^2$, camera module components molded using the composition may be deformed and damaged by the impact when, for example, the camera drops, and this may cause a problem.

<Melt Kneader and Its Operating Method>

The liquid crystal polyester resin composition according to the present invention is obtained by melting the liquid crystal polyester and kneading it with other components. No particular limitation is imposed on the apparatus used for melt kneading and its operating method, so long as they are generally used for melt kneading of a liquid crystal polyester.

Preferably, the liquid crystal polyester, the irregular form or spherical powder having a Mohs hardness of 5 or higher and a primary particle diameter of 5 μm or less, and the carbon black are mixed using a known mixing facility such as a ribbon blender, a tumbler blender, or a Henschel mixer. If necessary, the mixture is dried using, for example, a hot-air dryer or a vacuum dryer. The resultant mixture is fed to a kneader having a pair of screws from its hopper, and the fed mixture is melt-kneaded and extruded to form pellets.

The apparatus used is referred to as a twin screw extruder. Preferred examples of the twin screw extruder include an extruder of the co-rotating type that includes a cutting and turning mechanism that allows uniform dispersion of a filler, an extruder having a cylinder diameter of 40 mmϕ or more with a large space between the barrel and the screws to allow the screws to easily cut into the mixture, an extruder of the double-thread screw type, and an extruder with a large amount of engagement between the screws (more specifically, an engagement ratio of 1.45 or more).

<Melt Viscosity>

In the present invention, the melt viscosity of the liquid crystal polyester resin composition obtained as described above is preferably in the range of 10 to 150 (Pa·S) as measured at a shear rate of 100 $sec^{-1}$ and 370° C. This is because, if the melt viscosity is outside this range, the surface form of an injection molded product deteriorates and this may increase the amount of exfoliations. To measure the melt viscosity, a capillary rheometer (Model 2010, a product of INTESCO Co., Ltd.) is used, and a capillary having a diameter of 1.00 mm, a length of 40 mm, and an inflow angle of 90° is used. Apparent viscosity, i.e. melt viscosity measurement is performed at a shear rate of 100 $sec^{-1}$ while temperature is increased from 300° C. at a constant temperature rise rate of +4° C./min to determine the apparent viscosity at 370° C.

Camera module components of the present invention are obtained by injection molding of the above-described composition. The above range of melt viscosity is necessary to allow the molded products to have the desired stiffness and bearing performance. When a thin-wall component having a minimum thickness of 0.2 to 0.8 mm is produced, the use of the resin composition having a melt viscosity in the above range allows a molded product without compositional non-uniformity to be obtained because the resin composition injected into a 0.2 to 0.8 mm-thick space in a mold at high speed to fill the space flows uniformly in the mold. The obtained camera module has high abrasion resistance performance and high stiffness and causes only a reduced amount of objects falling off the surface of the molded product.

<Deflection Temperature Under Load>

In the present invention, the deflection temperature under load of the obtained injection molded product of the liquid crystal polyester resin composition is preferably 220° C. or higher and more preferably 245° C. or higher. The deflection temperature under load means a deflection temperature under load (DTUL) measured according to ASTM D648. If the deflection temperature under load is outside the above range, a problem in heat resistance during reflow soldering for surface mounting may occur.

No particular limitation is imposed on the injection molding conditions and injection molding apparatus used in the present invention, so long as they are known conditions and apparatus generally used for molding of a liquid crystal polyester.

EXAMPLES

The present invention will next be described in more detail by way of Examples and Comparative Examples, but the present invention is not limited to the following Examples.

Test Methods

The methods of measuring the performance of liquid crystal polyester resin compositions in the Examples and Comparative Examples and molded products obtained using these compositions and the methods of evaluating the performance will be shown below.

(1) Measurement of Melt Viscosity

The melt viscosity of each liquid crystal polyester resin composition was determined using a capillary rheometer (Model 2010, a product of INTESCO Co., Ltd.), and a capillary having a diameter of 1.00 mm, a length of 40 mm, and an inflow angle of 90° was used. Apparent viscosity measurement was performed at a shear rate of 100 $sec^{-1}$ while temperature was increased from 300° C. at a constant temperature rise rate of +4° C./min to determine the apparent viscosity at 370° C., and the determined viscosity was used as a test value. The resin composition dried in advance in an air oven at 150° C. for 4 hours was used for the test.

(2) Measurement of Melting Point

The melting point of the liquid crystal polyester (polymer) was measured using a differential scanning calorimeter (DSC) (a product of Seiko Instruments Inc.) with α-alumina used as a reference. In the measurement, temperature was increased from room temperature to 400° C. at a temperature rise rate of 20° C./min to completely melt the polymer. Then the temperature was decreased to 150° C. at a rate of 10° C./min and again increased to 420° C. at a rate of 20° C./min, and an endothermic peak obtained in this process was used as the melting point.

(3) Measurement of the Number of Exfoliations

Pellets of each obtained resin composition were molded into cylindrical injection molded products (referred to as carriers) used as test pieces for measurement of the number of objects falling off using an injection molding apparatus (UH-1000, a product of NISSEI PLASTIC INDUSTRIAL Co., Ltd.) at a maximum cylinder temperature of 350° C., an injection speed of 300 mm/sec, and a mold temperature of 80° C. Each test piece had dimensions of 7 mm (outer diameter)×4 mm (height)×6 mm (inner diameter) and had an thread structure with a pitch of 0.3 mm and a groove depth of 0.2 mm that was formed inside the test piece. Two test pieces were placed in 266 mL of pure water and subjected to ultrasonic cleaning at 40 kHz and a power of 480 W for 30 seconds. The number of objects falling off the test pieces, having a maximum diameter of 2 μm or larger, and contained in 10 mL of the pure water after ultrasonic cleaning was measured using SURFEX 200 (a product of Sonac Inc.). The measurement was repeated three times, and the average value was used as the measurement results.

(4) Measurement of Surface Hardness

The obtained pellets were molded into ASTM No. 1 tensile test pieces (dumbbells) using an injection molding apparatus (SG-25, a product of Sumitomo Heavy Industries, Ltd.) at a cylinder temperature of 350° C., an injection speed of 100 mm/sec, and a mold temperature of 80° C. Then the Rockwell hardness of each test piece was measured using ATF-F1000 (a product of Akashi Co., Ltd.) according to JIS K7202. The measured L-scale hardness (a ¼ inch steel ball, load: 60 kg) was used as the value of the Rockwell hardness.

(5) Measurement of Izod Impact Strength

The obtained pellets were molded into ASTM bending test pieces (strip test pieces) using an injection molding apparatus (SG-25, a product of Sumitomo Heavy Industries, Ltd.) at a cylinder temperature of 350° C., an injection speed of 100 mm/sec, and a mold temperature of 80° C. Then Izod impact strength with no notch was measured according to ASTM D256. The measurement was repeated 10 times, and the average value was calculated.

(6) Measurement of Deflection Temperature Under Load (DTUL)

The obtained pellets were molded into injection molded products (13 mm (width)×130 mm (length)×3 mm (thickness)) using an injection molding apparatus (SG-25, a product of Sumitomo Heavy Industries, Ltd.) at a cylinder temperature of 350° C., an injection speed of 100 mm/sec, and a mold temperature of 80° C. The obtained injection molded products were used as test pieces for measurement of deflection temperature under load. The deflection temperature under load (DTUL) was measured according to ASTM D648.

A Production Example of the liquid crystal polyester (LCP) is shown below.

Production Example

Production of Thermotropic Liquid Crystal Polyester (A)

A SUS316-made polymerization vessel (a product of KOBE STEEL, Ltd.) having an internal volume of 1,700 L and equipped with double-helical stirring vanes was charged with 298 kg (2.16 kmoles) of p-hydroxybenzoic acid (a product of UENO FINE CHEMICALS INDUSTRY, Ltd.), 134 kg (0.72 kmoles) of 4,4'-dihydroxybiphenyl (a product of Honshu Chemical Industry Co., Ltd.), 90 kg (0.54 kmoles) of terephthalic acid (a product of Mitsui Chemicals, Inc.), 30 kg (0.18 kmoles) of isophthalic acid (a product of A. G. International Chemical Co., Inc.), 0.04 kg of potassium acetate (a product of KISHIDA CHEMICAL Co., Ltd.) used as a catalyst, and 0.10 kg of magnesium acetate (a product of KISHIDA CHEMICAL Co., Ltd.) used a catalyst. The process of reducing the pressure inside the polymerization vessel and filling the vessel with nitrogen was repeated twice to replace the air inside the vessel with nitrogen. Then 386 kg (3.78 kmoles) of acetic anhydride was added. Temperature was increased to 150° C. at a rotation speed of the stirring vanes of 45 rpm over 1.5 hours, whereby an acetylation reaction was performed under reflux conditions for 2 hours. After completion of the acetylation, the temperature was increased at 0.5° C./min while the acetic acid was distilled. When temperature of the reactor (polymerization vessel) reached 305° C., the polymerization product was removed from an outlet in the lower portion of the reactor and cooled and solidified using a cooling apparatus. The obtained polymerization product was pulverized using a pulverizer (a product of Hosokawa Micron Group) such that the pulverized product passed through a sieve with an opening of 2.0 mm to obtain a prepolymer.

The obtained prepolymer was subjected to solid phase polymerization using a rotary kiln (a product of Takasago Industry Co., Ltd.). The kiln was filled with the prepolymer, and nitrogen was flowed through at a flow rate of 16 Nm³/hr. The temperature of a heater was increased from room temperature to 350° C. over 1 hour at a rotation speed of 2 rpm and was maintained at 350° C. for 10 hours. After the temperature of the resin powder in the kiln reached 295° C., heating was stopped, and cooling was performed over 4 hours while the rotary kiln was rotated to obtain a powdery liquid crystal polyester. Its melting point was 350° C., and the melt viscosity was 70 Pa·S.

Fillers (powders) used in the Examples and Comparative Examples below are as follows.

(1) Spherical fused silica: "FB-5SDC" (a product of DENKI KAGAKU KOGYO KABUSHIKI KAISHA, primary particle diameter: 4 μm, Mohs hardness: 6.5)

(2) Spherical fused silica: "FB-950" (a product of DENKI KAGAKU KOGYO KABUSHIKI KAISHA, primary particle diameter: 20 μm, Mohs hardness: 6.5)

(3) Titanium oxide: "SR-1" (a product of Sakai Chemical Industry Co., Ltd., primary particle diameter: 0.25 μm, Mohs hardness: 6.5)

(4) Aluminum oxide: "DAW-05" (a product of DENKI KAGAKU KOGYO KABUSHIKI KAISHA, primary particle diameter: 5 μm, Mohs hardness: 9)

(5) Carbon black (CB): "REGAL99" (a product of Cabot Corporation, primary particle diameter: 24 nm)

Examples 1 to 5 and Comparative Examples 1 to 3

The powdery liquid crystal polyester (A) obtained in the Production Example and a filler were mixed in a compositional ratio show in Table 1 using a ribbon blender, and the mixture was dried in an air oven at 150° C. for 2 hours. The dried mixture was melt-kneaded using a twin-screw extruder (KTX-46, a product of KOBE STEEL, Ltd.) with a preset maximum cylinder temperature of 380° C. at an extrusion speed of 140 kg/hr to obtain pellets of a target liquid crystal polyester resin composition. The obtained pellets were used for the measurements of various physical properties by the test methods described above. The results are shown in Table 2.

TABLE 1

| | COMPOSITION (PARTS BY MASS) | | | | | |
|---|---|---|---|---|---|---|
| | | FILLER | | | | |
| | LCP (A) | (1) SILICA, 4 μm | (2) SILICA, 20 μm | (3) TITANIUM OXIDE, 0.25 μm | (4) ALUMINUM OXIDE, 5 μm | (5) CARBON BLACK |
| EXAMPLE 1 | 58.0 | 40.0 | | | | 2.0 |
| EXAMPLE 2 | 68.0 | 30.0 | | | | 2.0 |
| EXAMPLE 3 | 49.5 | 50.0 | | | | 0.5 |
| EXAMPLE 4 | 55.0 | | | 40.0 | | 5.0 |
| EXAMPLE 5 | 58.0 | | | | 40.0 | 2.0 |
| COMPARATIVE EXAMPLE 1 | 58.0 | | 40.0 | | | 2.0 |
| COMPARATIVE EXAMPLE 2 | 73.0 | | | 25.0 | | 2.0 |
| COMPARATIVE EXAMPLE 3 | 45.0 | | | 53.0 | | 2.0 |

TABLE 2

RESULTS

| | MELT VISCOSITY Pa·S | NUMBER OF EXFOLIATIONS number | ROCKWELL HARDNESS — | IZOD IMPACT STRENGTH KJ/m² | DEFLECTION TEMPERATURE UNDER LOAD (DTUL) °C. |
|---|---|---|---|---|---|
| EXAMPLE 1 | 107 | 150 | 84 | 118 | 255 |
| EXAMPLE 2 | 95 | 155 | 81 | 120 | 260 |
| EXAMPLE 3 | 125 | 148 | 87 | 110 | 268 |
| EXAMPLE 4 | 130 | 180 | 90 | 45 | 250 |
| EXAMPLE 5 | 115 | 175 | 88 | 113 | 253 |
| COMPARATIVE EXAMPLE 1 | 133 | 175 | 78 | 38 | 240 |
| COMPARATIVE EXAMPLE 2 | 91 | 160 | 77 | 35 | 238 |
| COMPARATIVE EXAMPLE 3 | 220 | 210 | 88 | 20 | 235 |

As shown in Table 2, the liquid crystal polyester resin compositions of the present invention (Examples 1 to 5) had low melt viscosity, and this resulted in good moldability. In addition, they showed good results, more specifically, the number of exfoliations from the surfaces of the molded products was small, and the surface hardness was high. In addition, the Izod impact strength was good.

However, when the prescribed ranges in the present invention were not satisfied as in Comparative Examples 1 to 3, the results showed that at least one of the surface hardness, the amount of objects falling off the surfaces of the molded products, and the Izod impact strength was poor. In the resin composition of Comparative Example 1 in which a filler having a large primary particle diameter of 20 μm was used as the component (B), the melt viscosity was high, and the Rockwell hardness was low. In addition, the surface state was not smooth and was poor. Also in the resin composition of Comparative Example 2 in which the amount of the component (B) was lower than the lower limit in the present invention, the Rockwell hardness was low. With these resin compositions, the surface hardness of a molded product was insufficient. In the resin composition of Comparative Example 3 in which the amount of the component (B) was higher than the upper limit in the present invention, the melt viscosity was high, and the moldability was low. In addition, the number of exfoliations from the surfaces of the molded products was high. Therefore, this resin composition is not suitable for camera module components.

INDUSTRIAL APPLICABILITY

The liquid crystal polyester resin composition of the present invention and camera module components obtained using this composition have high surface hardness, high impact resistance, extremely less occurrence of exfoliations from the surfaces of the components and high heat resistance and can withstand reflow soldering. Therefore, the liquid crystal polyester resin composition can be used for various surface mountable camera module components, such as lens barrel sections, mount holder sections, frames of CMOSs (image sensors), shutters, shutter bobbin sections, and autofocus control members of, for example, the voice coil motor and piezoelectric motor types, for mobile phones, laptop computers, digital cameras, digital video cameras, and other devices.

What is claimed is:

1. A liquid crystal polyester resin composition for a camera module, comprising, based on 100 parts by mass of the composition as a whole,
   (A) 49.5 to 69.5 parts by mass of a liquid crystal polyester,
   (B) 30.0 to 50.0 parts by mass of an irregular form or spherical powder having a Mohs hardness of 5 or more and a primary particle diameter of 5 μm or less, and
   (C) 0.5 to 5.0 parts by mass of carbon black.

2. The liquid crystal polyester resin composition according to claim 1, wherein the (B) component is selected from titanium oxide, silica, and aluminum oxide.

3. The liquid crystal polyester resin composition according to claim 1, wherein the number of exfoliations from the surface of molded products molded by injection molding is 200 or less,
   the number of exfoliations being defined as the number of particles falling off when the two injection molded products are placed in 266 mL of pure water and subjected to ultrasonic cleaning at 40 kHz and a power of 480 W for 30 seconds, each of the injection molded products having a cylindrical shape of an outer diameter of 7 mm, an inner diameter of 6 mm, and a height of 4 mm, a screw structure with a pitch of 0.3 mm and a groove depth of 0.2 mm being formed on the inner surface of each of the injection molded products, the number of particles falling off being the number of particles contained in 10 mL of the pure water after cleaning and having a maximum diameter of 2 μm or larger.

4. The liquid crystal polyester resin composition according to claim 1, wherein a Rockwell hardness of a molded product molded by injection molding is 80 or higher.

5. The liquid crystal polyester resin composition according to claim 1, wherein an Izod impact strength of a molded product molded by injection molding is 40 KJ/m² or higher.

6. The liquid crystal polyester resin composition according to claim 1, wherein a deflection temperature under load of a molded product molded by injection molding is 245° C. or higher.

7. A camera module component produced by injection molding of the liquid crystal polyester resin composition according to claim 1.

* * * * *